3,401,132
MODIFIED ETHYLENE-VINYL ACETATE COPOLYMER-PETROLEUM WAX COMPOSITION
Terry R. Eihl and Robert G. Weisz, Park Forest, Ill., assignors to Standard Oil Company, Chicago, Ill., a corporation of Indiana
No Drawing. Filed Sept. 19, 1966, Ser. No. 580,214
10 Claims. (Cl. 260—28.5)

ABSTRACT OF THE DISCLOSURE

Modified ethylene-vinyl acetate copolymer-petroleum wax compositions are made by inclusion of dimethyl alpha-methyl styrene/alpha-methyl styrene copolymers.

---

This invention relates to modified ethylene-vinyl acetate copolymer-petroleum wax compositions, and more particularly to such compositions having dimethyl-alpha-methyl styrene/alpha-methyl styrene copolymers as modifying material.

Compositions using ethylene-vinyl acetate copolymers as petroleum wax additives are known in the art. It is also known that modifying materials are desirable in such compositions in order to provide properties desirable for use as hot melt adhesives, coatings, and films. One of the more important commercial uses for these compositions is the coating of "form and fill" packaging materials and of other cellulosic sheet materials such as paper, paper board, glassine, and corrugated, as well as hot melt adhesives for paper and packaging films. A flexible cellulosic sheet material may be coated with the composition and formed into a container by heat-sealing the overlapping surfaces together.

Modifying agents are added to improve the hot tack properties of the composition. That is the adhesive strength of these blends when they are hot. The ethylene-vinyl acetate copolymer- petroleum wax blends known heretofore are generally unsuitable for use as heat-sealable coatings where the heat-sealed bonds are subjected to any substantial parting forces while the bonds are still hot.

In addition to improving the hot tack properties, it has also been found desirable to incorporate a modifying agent for improvement of the following properties: strength, blending, adhesiveness, hardness, blocking temperature, clarity, viscosity, coating machine performance, moisture barrier properties, heat-seal properties, flexibility, etc. Materials currently utilized as modifiers are rosin and reacted rosin products such as polymerized rosin, esterified rosin, etc. In addition, some phenol condensation resins have been utilized as well as petroleum derived hydrocarbon resins. A copolymer resin of vinyl toluene and alpha-methyl styrene is also used.

The rosins, phenolic type resins, and the conventional hydrocarbon resins are of limited value because of heat stability, color, or odor problems. The vinyl toluene-alpha-methyl styrene resins are limited because of the relatively narrow compatibility relationship in the paraffin wax-ethylene-vinyl acetate systems, relatively high molecular weight and high viscosity, in addition to the high cost.

The utilization of dimethyl-alpha-methyl styrene/alpha-methyl styrene copolymers have been found to impart excellent properties of heat stability, color, odor, and performance to the ethylene-vinyl acetate petroleum wax compositions, with a considerable saving of cost. Furthermore, the wide range of compatibility of the modifying agent in the blends allows choice of blends to meet the individual needs of various applications without sacrificing the major advantages. In addition, the dimethyl-alpha-methyl styrene/alpha-methyl styrene copolymers have unexpectedly been found to have advantages over the prior art modifiers since they possess properties of easier blending, higher clarity, lower viscosity, better coating machine performance, superior moisture vapor transmission rate characteristics, superior heat-seal properties, better flexibility, and better block properties.

Although homopolymers of alpha-methyl styrene or dimethyl-alpha-methyl styrene are not particularly suited to a broad range of applications in conjunction with ethylene-vinyl acetate copolymer hot melt systems because of too little or too much compatibility respectively, the copolymers, with small amounts of either have been found to offer a wide selection of compatibility to suit the specific end-use requirements. Fairly high concentrations of either alpha-methyl styrene or dimethyl-alpha-methyl styrene will impart sufficient compatibility to make the system acceptable. This is truly unexpected in view of the prior art requirements of low concentrations of alpha-methyl styrene to gain acceptable performance.

Briefly, the composition of this invention comprises an ethylene-vinyl acetate copolymer, a petroleum wax, and a dimethyl alpha-methyl styrene/alpha-methyl styrene copolymer. Because of the wide range of compatibility, any ethylene-vinyl acetate copolymer or petroleum wax known to the art for use in hot melt compositions, may be utilized in this invention. More specifically, the composition comprises, by weight 5 to 90% petroleum wax having a melting point in the range of 125 to 200° F., 5 to 60% ethylene-vinyl acetate having a copolymerized vinyl acetate content of between 15 and 40% and a melt index of less than 50, and 5 to 75% dimethyl-alpha-methyl styrene/alpha-methyl styrene, having a copolymerized dimethyl-alpha-methyl styrene content of between 10 and 90% and a ring and ball softening point between 160 and 325° F. Generally, the ethylene-vinyl acetate copolymer should comprise between 15 and 40 weight percent copolymerized vinyl acetate content, advantageously between 20 and 35 weight percent and preferably between 25 and 30 weight percent. Consequently the copolymerized ethylene content will be between 60 and 85 weight percent, advantageously between 65 and 80 weight percent and preferably between 70 and 75 weight percent. The molecular weight of the ethylene-vinyl acetate copolymer may vary over a fairly broad range since acceptable performance may be obtained by varying the molecular weight distribution in relation to the molecular weight. The molecular weight, expressed in terms of melt index (ASTM D-1238-57T) should be less than 50, advantageously 1-30 and preferably 1-12.

The petroleum waxes which may be used in this invention include both paraffin and microcrystalline waxes having a melting point in the range of about 125–175° F. and 150–200° F., respectively. Mixtures of various waxes are also suitable. A preferred class of petroleum wax is the paraffin wax, having a melting point of between 140 and 165° F.

The dimethyl-alpha-methyl styrene/alpha-methyl styrene copolymer may be used in all proportions depending upon the end use. Suitably, the copolymer may vary from 10 to 90 weight percent copolymerized dimethyl alpha-methyl styrene content and, 10 to 90 weight percent copolymerized alpha-methyl styrene content, advantageously 30 to 60% dimethyl-alpha-methyl styrene and 40 to 70 percent alpha-methyl styrene, and preferably 30–45% dimethyl-alpha-methyl styrene and 55–70% alpha-methyl styrene. All proportions give essentially 100% yield of copolymers of excellent color. The copolymerization reaction is very rapid and as a result is nearly adiabatic. The ring and ball softening point should be between about 160 and 325° F., advantageously 200–300° F. and preferably 220 and 260° F. The softening point of the resin can be controlled by varying the temperature at which the monomer solution is contacted with the catalyst, and the catalyst concentrations. The temperatures may range from about −60° F. to +50° F. The copolymers may be made by contacting solutions of the two monomers in an inert solvent with an acid type catalyst; boron trifluoride and aluminum trichloride are particularly suitable. Any isomer of dimethyl-alpha-methyl styrene may be used, suitably 3,4-dimethyl-alpha-methyl styrene, 2,3 - dimethyl-alpha-methyl styrene, 2,5 - dimethyl-alpha-methyl styrene, 2,4-dimethyl-alpha-methyl styrene, 3,5 - dimethyl - alpha - methyl styrene, and preferably 3,4-dimethyl-alpha-methyl styrene since this isomer exhibits the best solubility characteristics. The copolymerization may be performed either in batch or by continuous operation, preferably continuous.

The ratio of the ethylene-vinyl acetate copolymer, petroleum wax, and dimethyl-alpha-methyl styrene/alpha-methyl styrene copolymer in the composition will depend upon the end-use of the composition. By adjusting the content of the materials within the two copolymers and by adjusting the ratio of each of the components a blend may be obtained having properties highly desirable for a given use. Since the individual ingredients may be combined in all proportions, the choice of proportions will be determined by the properties desired. For example, a composition useful as an adhesive may have very small amounts of petroleum wax, i.e., from about 5% or less to about 60%. However, for a coating the wax may be present in amounts in excess of 90% to as low as 35%. In like manner the content of the ethylene-vinyl acetate and dimethyl-alpha-methyl styrene/alpha-methyl styrene copolymers will vary over a fairly broad range in order to obtain the desired properties. Generally, the ethylene-vinyl acetate may be present in amounts of from 5% to 60%, the lower amounts of 5 to 40% benig desirable for coatings and preferably 20 to 40%, and the higher amounts of 25 to 60% suitable for adhesives, preferably 25 to 50%. The dimethyl-alpha-methyl styrene/alpha-methyl styrene copolymer may be present in amounts ranging from about 5 to 75%, with less being required for use as coating, suitably 5 to 40% and preferably 10 to 30%, and a suitable range for an adhesive composition may be 20 to 75% and preferably 20 to 50%. The above percentages are weight percentages based on the entire composition.

It is understood that the above ratios also vary with the ratios of the materials comprising the respective copolymers themselves. As a general rule the following relationships may be applied in order to arrive at a composition having the desired properties: The wax content may be increased as the copolymerized dimethyl-alpha-methyl styrene content in the respective copolymer is increased, likewise the ethylene-vinyl acetate copolymer may be increased as the copolymerized dimethyl-alpha-methyl styrene content is increased; the copolymerized alpha-methyl styrene content of the respective copolymer may be increased if the copolymerized vinyl-acetate content of the ethylene-vinyl acetate copolymer is increased.

A coating composition may advantageously comprise, by weight: 20 to 40% of an ethylene-vinyl acetate copolymer having a copolymerized vinyl acetate content of 25 to 30%, 10 to 30% of a dimethyl-alpha-methyl styrene/alpha-methyl styrene copolymer having a copolymerized dimethyl-alpha-methyl styrene content of 30 to 45% and 45 to 65% of petroleum wax, having a melting point of between 140 and 165° F. Most preferably, the composition comprises 20 to 30% of an ethylene-vinyl acetate copolymer having a copolymerized vinyl acetate content of 25 to 30% and a melt index of 1–10, 50 to 60% petroleum wax having a melting point of between 145 and 160° F., 15 to 20% dimethyl-alpha-methyl styrene/alpha-methyl styrene copolymer having a copolymerized dimethyl-alpha-methyl styrene content of 30 to 45% and a softening point between 220 and 260° F.

Preparation of the compositions of this invention may be accomplished by thoroughly blending the components at an elevated temperature. The agitation or mixing may be accomplished by any conventional high shear mixer, the only requirement being that the components be thoroughly blended so as to provide a uniform composition. It is desirable that the composition be prepared at a temperature in the range of about 300 to 350° F. This range is chosen since the ethylene-vinyl acetate copolymer becomes quite unstable above 400° F. In addition, it has been found desirable to add an antioxidant during the blending in order to allow sufficient time to blend at the temperatures indicated. Suitable antioxidants are 2,6-di-tert-butyl-$p$-cresol, and 4,4' - methylene - bis(2,6 - di-tert-butylphenol).

Compositions of this invention may be coated by any conventional coating system for high viscosity hot melts, or if they are to be used as adhesives any conventional adhesive applicator may be utilized. It has been found particularly desirable to maintain the composition at a temperature of from 300 to 350° F. when coating by means of a roll coater.

The following examples are given by way of illustration.

Examples

In the Examples 1–8 below, the following procedure was used: Paraffin wax having a melting point of about 150° F. was added to a 2-liter stainless steel kettle and heated to 300° F. with agitation. 0.1 weight percent of antioxidant was then added to heat-stabilize the system, 4,4'-methylene-bis(2,6-di-tert-butylphenol) was used in Examples 1–7 and 2,6-di-tert-butyl-$p$-cresol was used in Examples 8 and 9. Ethylene-vinyl acetate copolymer having a copolymerized vinyl acetate content of 28 weight percent and a melt index of 3, was then added slowly with agitation, and heating was continued at 300° F., with agitation until all the ethylene-vinyl acetate appeared dissolved and the blend became smooth and clear. During heating the viscosity of the blend increased and agitation was lowered in order to prevent air entrapment. Dimethyl-alpha-methyl styrene/alpha - methyl styrene copolymer was then added at 275° F. with continued agitation until the copolymer was completely dissolved.

The same procedure was followed in Example 9 except that vinyl-toluene alpha-methyl styrene having a copolymerized vinyl toluene content of 65 weight percent and a softening point of 239° F., was added in place of dimethyl-alpha-methyl styrene/alpha-methyl styrene in order to exhibit the effectiveness of this invention over a wide range of copolymers and proportions as compared with preferred prior art compositions.

In Examples 10–14 several of the compositions as indicated were used in preparing a paper coating on a Dusenberg roll coater as follows: The blend was held constant at 325° F. and the pick up roll and doctor blade were maintained at the temperature indicated. The coatings were applied to 7-inch wide paper. The papers used were bleached sulfite (25 lbs./3,000 ft.²) and glassine (23 lbs./3,000 ft.²).

| | Formulation | | | | |
|---|---|---|---|---|---|
| Ex. | Wax, wt. percent | Ethylene/ vinyl acetate, wt. percent | Dimethyl-alpha-methyl styrene/alpha-methyl styrene (DMAMS/AMS) | | Vinyl toluene/ alpha-methyl styrene, wt. percent |
| | | | Wt. percent | DMAMS content, wt. percent | Softening point, ° F. | |
| 1 | | | | | | |
| 2 | 54.9 | 30 | 15 | 25 | 263 | |
| 3 | 59.9 | 20 | 20 | 25 | 263 | |
| 4 | 59.9 | 20 | 20 | 50 | 245 | |
| 5 | 49.9 | 25 | 25 | 25 | 263 | |
| 6 | 49.9 | 25 | 25 | 50 | 245 | |
| 7 | 51.9 | 30 | 18 | 15 | 228 | |
| 8 | 51.9 | 30 | 18 | 50 | 245 | |
| 9 | 51.9 | 30 | 18 | 35 | 239 | |
| | 51.9 | 30 | | | | 18 |

| Example | Formulation composition of example | Coating temp., °F. | Coating wt., lbs./3,000 ft.² | Paper coated |
|---|---|---|---|---|
| 10 | 1 | 308 | 10.2 | Sulfite. |
| 11 | 2 | 304 | 11.7 | Do. |
| 12 | 4 | 312 | 10.6 | Do. |
| 13 | 8 | 315 | 7.5 | Glassine. |
| 14 | 9 | 315 | 7.5 | Do. |

The following tables illustrate the effectiveness of this invention. Various properties of several of the above examples were tested using standard ASTM methods or methods developed by the Technical Association of Pulp and Paper Institute (TAPPI) as indicated below.

Table I lists the results of the tests used to determine the physical properties of the compositions and include:

(1) *Viscosity.*—The viscosity was measured at 300° F. and is reported in cps. using a standard Brookfield Viscosity Test.

As low a viscosity as possible is desired in order to allow use of lower temperatures in coating and in order to provide ease of coating and a more continuous coating.

(2) *Tensile strength and elongation.*—The tensile strength and elongation were measured by ASTM method D-412 Die C at ½ inch per minute crosshead speed. The tensile strength is given in pounds per square inch and elongation is given as the percentage elongation at break.

These tests measure the toughness of the film and consequently the strength of the blend as well as the cohesiveness of the adhesive. As high a number as possible is desired.

(3) *Hardness.*—The hardness was measured by ASTM method D-1706 using a Shore A-2 durometer at 10 seconds.

The harder the composition, the higher will be the number, and the hardest surface possible is the most desirable.

Table II below lists the results of tests performed on coatings as applied to paper and include:

(1) *Blocking point.*—The blocking point was measured by TAPPI method T-652 and is reported in ° F.

The blocking point test is an accelerated means of storing 2 coated surfaces in contact with each other under controlled conditions of temperature and pressure. The temperature at which 50 percent surface marring occurs upon separation is recorded. The higher the blocking point, the better is the coating.

(2) *Picking point.*—The picking point was measured by TAPPI method T-652 and is reported in ° F.

In this test the temperature at which film disruption first occurs is measured. It is desirable to have the picking point as close as possible to the blocking point.

(3) *Seal strength.*—The seal strength was measured by TAPPI method T-642 as reported in grams per inch. The heat-seal used for this test was accomplished at a temperature of 210° F., a dwell time of 0.5 second and at a pressure of 30 pounds per square inch.

As high a figure as possible is desired in this test and the most desired condition would be a tear in the article coated before the coating tears. When this occurs it is reported as "fiber tear."

(4) *Water vapor transmission rate.*—This test was performed using TAPPI methods T-464 (flat surface) and T-465 (creased surface), and is reported in grams of water per 24-hour period per 100 square inches at 100° F. and 90% relative humidity.

In this test the amount of moisture which will pass through the given area of coating under given conditions is measured. A low figure is desired since the coating should have a low permeability.

(5) *Grease resistance.*—This test was performed using TAPPI method 454 M-60. In this test the coating is measured for its resistance to being stained by peanut oil in a given period of time.

It is desirable that the oil does not stain the coating.

TABLE I.—PHYSICAL PROPERTIES OF THE COMPOSITION

| Composition of example | Viscosity | Tensile strength | Elongation | Hardness |
|---|---|---|---|---|
| 1 | 3,440 | 595 | 533 | 98 |
| 2 | 760 | 529 | 46 | 97 |
| 3 |  | 557 | 78 | 95 |
| 4 | 2,200 | 534 | 301 | 99 |
| 5 |  | 677 | 240 | 95 |
| 8 | 4,350 | 542 | 300 | 95 |
| 9 | 4,400 | 530 | 100 | 96 |

TABLE II.—PAPER COATING EVALUATIONS

| Composition of example | Blocking point | Picking point | Seal strength | Water vapor transmission rate | | Grease resistance |
|---|---|---|---|---|---|---|
| | | | | Flat | Creased | |
| 1 | 135 | 135 | Fiber tear | | | Did not stain after 24 hours. |
| 2 | 138 | 138 | do | | | Do. |
| 4 | | | do | | | Do. |
| 8 | 121 | 109 | do | 1.54 | 2.44 | Do. |
| 9 | 129 | 112.5 | 52 | 2.27 | 4.12 | Do. |

It may be seen from Tables I and II that the compositions of this invention have surprisingly desirable properties. Not only have these compositions proved to be adequate as coatings, but they have exhibited superior properties over the coating of Example 9. The properties of good film strength and good seal strength are the most difficult to achieve. The tables clearly show the advantages of our compositions as compared with the most satisfactory compositions known to the art.

We claim:

1. A composition comprising, by weight, (a) 5–60% ethylene-vinyl acetate copolymer having a copolymerized vinyl acetate content of 15–40%, (b) 5–90% petroleum wax, (c) 5–75% dimethyl-alpha-methyl styrene/alpha-methyl styrene copolymer.

2. The composition of claim 1 wherein the ethylene-vinyl acetate copolymer has a melt index of less than 50, the petroleum wax has a melting point in the range of 125–200° F., and the dimethyl-alpha-methyl styrene/alpha-methyl styrene copolymer has a softening point in the range of 160–325° F., and a copolymerized dimethyl-alpha-methyl styrene content in the range of 10–90%.

3. The composition of claim 1 wherein the petroleum wax is a paraffin wax.

4. The composition of claim 2 wherein the ethylene-vinyl acetate copolymer has a melt index in the range of 1–30, and a copolymerized vinyl acetate content in the range of 20–35%, and the dimethyl-alpha-methyl styrene/alpha-methyl styrene copolymer has a softening point in the range of 200–300° F., and a copolymerized dimethyl-alpha-methyl styrene content in the range of 30–60%.

5. The composition of claim 4 wherein the melt index is 1–12, and the vinyl aceate content is 25–30 and the softening point is 220–260° F. and the dimethyl-alpha-methyl styrene content is 30–45%.

6. The composition of claim 2 wherein the ethylene vinyl acetate content is 5–40%, the wax content is 35–90% and the dimethyl-alpha-methyl styrene/alpha-methyl styrene content is 5–40%.

7. The composition of claim 6 wherein the ethylene-vinyl acetate content is 20–40% and the copolymerized vinyl acetate content is 25–30%, and the wax is a paraffin wax having a melting point in the range of 140–165° F., the content of said wax being 45–65%, and the dimethyl-alpha-methyl styrene/alpha-methyl styrene content is 10–30% and the copolymerized dimethyl-alpha-methyl styrene content is 30–45%.

8. The composition of claim 7 wherein the ethylene-vinyl acetate content is 20–30% the copolymerized vinyl acetate content is 25–30% and the melt index is 1–10, the wax content is 50–60%, and the melting point is 145–160° F., the dimethyl-alpha-methyl styrene/alpha-methyl styrene content is 15–20%, the softening point is 220–260° F. and the copolymerized dimethyl-alpha-methyl styrene content is 30–45%.

9. The composition of claim 2 wherein the ethylene-vinyl acetate content is 25–60%, the wax content is 5–60% and the dimethyl-alpha-methyl styrene/alpha-methyl styrene content is 20–75%.

10. A flexible cellulosic sheet material coated with the composition of claim 1.

References Cited

UNITED STATES PATENTS

| | | | |
|---|---|---|---|
| 3,245,931 | 4/1966 | Matthew | 260—28.5 |
| 3,306,882 | 2/1967 | Pullen | 260—28.5 |
| 2,645,632 | 7/1953 | Le Crotenhius | 260—28.5 |

JULIUS FROME, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,401,132                      September 10, 1968

Terry R. Eihl et al.

It is certified that error appears in the above identified patent and that said Letters Patent are hereby corrected as shown below:

Column 3, line 35, "benig" should read -- being --. Column 4, in the table, first column, the numerals 1 thru 9 should be realigned so that they will be opposite the similar lines in the remaining columns of the table. Column 6, TABLE I, fourth column, line 7 thereof, "100" should read -- 10 --; line 61, "aceate" should read -- acetate --.

Signed and sealed this 10th day of March 1970.

(SEAL)
Attest:

Edward M. Fletcher, Jr.                      WILLIAM E. SCHUYLER, JR.
Attesting Officer                              Commissioner of Patents